(12) United States Patent
Criel et al.

(10) Patent No.: US 8,496,867 B2
(45) Date of Patent: Jul. 30, 2013

(54) PROCESS FOR MANUFACTURING A FUEL TANK

(75) Inventors: Bjorn Criel, Sint-Martens-Lennik (BE); Jean-Claude Mur, Le Plessis Brion (FR); David Hill, Commerce Township, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 138 days.

(21) Appl. No.: 12/997,404

(22) PCT Filed: Jun. 23, 2009

(86) PCT No.: PCT/EP2009/057832
§ 371 (c)(1),
(2), (4) Date: May 11, 2011

(87) PCT Pub. No.: WO2010/006900
PCT Pub. Date: Jan. 21, 2010

(65) Prior Publication Data
US 2011/0221104 A1  Sep. 15, 2011

(30) Foreign Application Priority Data
Jun. 23, 2008 (FR) ................................. 08 54122

(51) Int. Cl.
*B29C 49/20* (2006.01)
(52) U.S. Cl.
USPC .................... 264/516; 264/523; 264/531
(58) Field of Classification Search
None
See application file for complete search history.

(56) References Cited

U.S. PATENT DOCUMENTS

| 2001/0015513 | A1 | 8/2001 | Schaftingen et al. |
| 2005/0205156 | A1 | 9/2005 | Ganachaud et al. |
| 2007/0290414 | A1* | 12/2007 | Criel .......................... 264/531 |
| 2008/0078761 | A1 | 4/2008 | Borchert et al. |

FOREIGN PATENT DOCUMENTS

| DE | 10010900 A1 | 9/2001 |
| DE | 10214900 A1 | 4/2004 |
| EP | 0139841 A1 | 5/1985 |
| EP | 1110697 A2 | 6/2001 |
| EP | 1894702 A2 | 3/2008 |
| GB | 1410215 A | 10/1975 |
| WO | WO 9902322 A2 | 1/1999 |
| WO | WO 2004024487 A1 | 3/2004 |
| WO | WO 2006008308 A1 | 1/2006 |
| WO | WO 2006095024 A1 | 9/2006 |
| WO | WO 2007000454 A1 | 1/2007 |
| WO | WO 2008145246 A1 | 12/2008 |
| WO | WO 2010081853 A1 | 7/2010 |

OTHER PUBLICATIONS

U.S. Appl. No. 13/143,095, filed Jul. 11, 2011, Bjorn Criel, et al.

* cited by examiner

*Primary Examiner* — Monica Huson
(74) *Attorney, Agent, or Firm* — Oblon, Spivak, McClelland, Maier & Neustadt, L.L.P.

(57) ABSTRACT

Process for manufacturing a plastic fuel tank equipped with a component, by molding a parison using a mold comprising two cavities and a core, the process comprising the mounting of a component around a needle or an oblong object attached to the core, the displacement of the needle or oblong object so as to deform the parison and pierce an opening into it, the needle or oblong object carrying the component with it in order to position the component in the opening, and the withdrawal of the needle/oblong object, leaving the component lodged in the opening.

13 Claims, 9 Drawing Sheets

PROCESS FOR MANUFACTURING A FUEL TANK

CROSS-REFERENCE TO RELATED APPLICATIONS

This application is a U.S. national stage application under 35 U.S.C. §371 of International Application No. PCT/EP2009/057832 filed Jun. 23, 2009, which claims priority to French Patent Application No. 08.54122 filed Jun. 23, 2008, the whole content of this application being incorporated herein by reference for all purposes.

TECHNICAL FIELD OF THE INVENTION

The present invention relates to a process for manufacturing a plastic fuel tank equipped with a component.

BACKGROUND OF THE INVENTION

Fuel tanks on board vehicles of various kinds generally have to meet sealing and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the components (ventilation lines, valves, baffles, stiffeners, etc.) inside the tank and/or the fill pipe (see in particular application WO 2004/024487 in the name of the Applicant). However, when these components are fastened to the tank after it has been molded, it is generally necessary to make at least one opening in the tank so as to be able to introduce these components into the tank and to fasten them thereto. Hence there may be potential sealing problems near this opening.

Several years ago the Applicant therefore developed a process of initially molding a cut parison (cut into 2 sections) in order to be able to introduce thereinto and fasten thereto components during the actual molding of the tank and to thus avoid piercing openings (see patent EP 1 110 697 in the name of the Applicant).

This process has since been the subject of several improvements targeting particular means for fastening these components: see in particular applications WO 2006/008308 (fastening of components by rivet punching), WO 2006/095024 (fastening of ventilation lines that have a part that can be deformed due to the presence of a bend that is stretched during the attachment of these lines to the parison) and WO 2007/000454 (fastening of components according to an ideal layout and in particular, as regards the ventilation lines, while avoiding the formation of siphons).

These improvements have been able to be made due to the use of a core, i.e. a part of suitable size and shape for being able to be inserted between the cavities of the mold when the parison is located therein and to fasten thereto the components inside the tank without the edges of the parison being welded (since the core must be removed before the final molding of the tank, a step during which the welding of the parison sections is carried out). Such a part (core) is, for example, described in patent GB 1 410 215, the content of which is for this purpose incorporated by reference into the present application.

The installation of the components may be, in certain cases (e.g. when they are components that pass through the wall in order to enable communication with the outside), a difficult undertaking which, when the wall is multilayered, may result in the barrier layer being damaged and/or a connection being obtained that is not very leaktight.

SUMMARY

The objective of the present invention is to provide a process for manufacturing a fuel tank in which the installation of a component is rapid, precise and leaktight, even when it is a component intended to pass through the wall of the tank and to establish a connection between its internal volume and the outside.

For this purpose, the invention relates to a process for manufacturing a plastic fuel tank equipped with a component, by molding a parison using a mold comprising two cavities and a core, said process comprising the following steps:

A) introduction of a parison into the mold cavities;
B) introduction of a core inside the parison, said core having first been fitted with a component;
C) closure of the mold so that the cavities come into leaktight contact with the core;
D) pressing of the parison against the cavities by blowing through the core and/or applying a vacuum behind the cavities;
E) installation of the component on the inner wall of the parison using a device attached to the core;
F) opening of the mold in order to withdraw the core; and
G) final molding of the parison by blow-molding (by injecting a pressurized fluid inside the parison) and/or thermoforming (by applying a vacuum behind the cavities).

According to one important aspect of the invention, the process also comprises, in step B, the mounting of the component around a needle or other oblong object comprising a cutting device attached to the core and, in step E:

E1) the displacement of the needle or the cutting device so as to first deform the parison and after, piercing an opening into it, the needle or oblong object carrying the component with it in order to position the component in the opening; and
E2) the withdrawal of the needle or oblong object, leaving the component lodged in the opening.

BRIEF DESCRIPTION OF THE DRAWINGS

For a detailed description of the invention, reference will now be made to the accompanying drawings in which.

DETAILED DESCRIPTION OF PREFERRED EMBODIMENTS

For sake of simplicity, "needle" will generally be used in the rest of the specification, it being understood that this term also designates other oblong object as will be defined later on in the specification.

By virtue of the mounting of the component using such a "needle", the installation of the component may be carried out rapidly and precisely during the molding of the parison. The manufacturing costs may be reduced while increasing the quality of the fuel tank manufactured, the connection obtained being particularly leaktight even in the case of a component that passes through the wall of a multilayer tank. This advantage is mainly obtained through the fact that the parison is first deformed (stretched) by the component and then only cut/pierced, which was found to reduce the damage to the parison (and more specifically: to the barrier layer in the case of a multilayer parison). This also allows a better control of the tank wall around the inner plastic component and a better barb forming. In the case of a multilayer parison, this design also positions the barrier layer more to the outer surface of the filler neck so that the permeation is reduced.

The term "fuel tank" is understood to mean an impermeable tank that can store fuel under various and varied environment and usage conditions. An example of this tank is that with which motor vehicles are equipped.

The fuel tank according to the invention is made of plastic. The term "plastic" means any material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion of their molecular weight.

In particular, polyolefins, thermoplastic polyesters, polyketones, polyamides and their copolymers may be used. A blend of polymers or copolymers may also be used; similarly it is also possible to use a blend of polymeric materials with inorganic, organic and/or natural fillers such as, for example, but non-limitingly: carbon, salts and other inorganic derivatives, and natural or polymeric fibres. It is also possible to use multilayer structures composed of stacked and joined layers comprising at least one of the polymers or copolymers described above.

One polymer often employed is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between the HDPE-based outer layers, the EVOH and HDPE layers being bonded by adhesive layers (generally comprising modified PE, for instance grafted with an acid or an anhydride, like maleic anhydride).

It should be noted that the use of the process according to the invention is particularly advantageous when the tank comprises such a layer that is a barrier to liquids and/or gases. When the component is installed and has deformed the parison in order to create a kind of flange (fixation zone) towards the outside of the tank, the "needle" pierces/cuts an opening in the parison. During this deformation of the parison towards the outside, the assembly (flange and component on "needle") is preferably received in a hole of suitable size and shape in one of the mold cavities, and which is preferably created during step E (or just before it, after step D has been carried out), generally by retraction of a moving part into said hole. During the fastening of the component to the parison, the structure of the parison remains unchanged, i.e. none of the various layers of material are damaged during the fastening. Hence, the layer that is a barrier to liquids and/or gases also extends beyond the fastening point and thus makes it possible to guarantee the impermeability of the tank in the region of the component.

This is because during the above described deformation, a kind of flange comprising a barrier layer is molded on the surface of the component, which makes indeed the hole fixation very leaktight and impermeable.

According to the invention, the tank is produced by molding a parison. The term "parison" is understood to mean a preform, which is generally extruded and is intended to form the wall of the tank after molding to the required shapes and dimensions. This preform does not necessarily have to be a one-piece preform. Thus, advantageously, the parison is in fact made up of two separate pieces, which may be two sheets, for example. However, these pieces preferably result from cutting one and the same extruded tubular parison as described in the aforementioned application EP 1 110 697, the content of which is, for this purpose, incorporated by reference in the present application. According to this variant, once a single parison has been extruded, this parison is cut over its entire length, along two diametrically opposed lines, to obtain two separate portions (sheets).

Compared with the molding of two separately extruded sheets, of constant thickness, this approach allows the use of parisons having a variable thickness (that is to say a thickness that is not constant over their length), which are obtained by a suitable extrusion device (generally an extruder provided with a die having a positionally adjustable mandrel). Such a parison takes account of the reduction in thickness that occurs during molding at certain points on the parison, as a result of non-constant levels of deformation of the material in the mold.

After a parison has been molded in two pieces, these pieces generally form the lower and upper walls respectively of the fuel tank, each having an inner surface (pointed towards the inside of the tank) and an outer surface (pointed towards the outside of the tank).

The mold used in the process according to the invention comprises a core as defined previously and two cavities that are intended to be in contact with the outer surface of the parison, the parison being molded by blow-molding (pressing the parison against these cavities using a pressurized gas injected into the parison) and/or thermoforming (drawing a vacuum behind the mold cavities). As already mentioned previously, at least one of the cavities preferably comprises a hollow relief designed to receive within it the piercing needle and also, optionally, at least one part of the component that may or may not be covered with part of the parison (as illustrated in the figures appended to the present document).

Preferably, the molding takes place by blow-molding, but preferably while also providing suction (drawing a vacuum) behind the cavities to keep the parison in the mold when the latter is not closed and pressurized. Hence, it preferably comprises a degassing step prior to step (F). Generally, in order to do this, the parison is first pierced (for example by puncturing it with a needle) and then the fluid is discharged from the mold (for example using a valve). In this variant, it is advantageous to provide the hollow relief of the aforementioned cavity with at least one plug that makes it possible to plug the opening in the parison and the component, where appropriate, when the needle is withdrawn, in order to be able to effectively blow-molding the tank.

The term "component" is understood to mean, within the context of the invention, an element mounted inside the fuel tank, on the inner wall of the latter. More particularly, the component advantageously comprises a passage that, when the component is installed, passes through the wall of the fuel tank. The invention gives good results with tubes or pipes. The component according to the invention may be a ventilation pipe; a line for pumping fuel or for returning fuel from the engine to the tank (in the case of diesel engines); a filler neck; an electric line (in this case, the pipe is generally the sheathing of an electrical cable), etc. Such a component is preferably used to transport something (a fluid, electricity, etc.). Hence, more preferably, the component is a filler neck, a ventilation pipe, an OBD (On Board Diagnosis) line or an electrical connector.

In this variant, it is through the passage in the component that the needle/cutting device pierces/cuts, while the deformation of the parison towards the outside is mainly induced by the component itself, which hence "protects" the needle/cutting device in order to obtain said deformation before piercing/cutting occurs. It is also via this opening that the component is received on the needle/oblong object attached to the core with a view to fastening it to the tank. The process according to the invention applies most particularly well to a neck and in particular to the filler neck of the tank. In this case, the passage in the component corresponds to the passage for the fluid and the needle/oblong object has, at least at its base, a diameter substantially equal to that of this passage.

According to a preferred embodiment of the present invention, in order to prevent molten plastic material from the parison to enter into the opening of the component where the "needle" is received, said opening is in fact closed when the component is mounted on the "needle" and only pierced/cut open when the "needle" pierces/cuts the parison. For this purpose, the thickness and/or strength of the component wall is preferably adapted in that area in order to allow said piercing/cutting.

The term "needle" is understood to mean, within the context of the invention, an element mounted on the core in order to temporarily carry the component to be installed and to pierce/cut an opening in the parison. For this purpose, the "needle" is preferably movably mounted relative to the core, e.g. with the aid of an actuator, so as to be able to move the needle in the direction of and through the parison. The movement of the "needl"e also carries the component with it until deformation of the parison is sufficient; the opening is then pierced/cut and the component is left in contact with the inner surface of the parison. The needle/oblong object bearing the cutting device is then moved in the direction of the core, that is to say that it is withdrawn from the pierced opening, leaving the component lodged in the pierced opening and fixed to the portion of it deformed towards the outside.

According to a preferred embodiment of the present invention, the component is a filler neck integrating an ICV (Inlet Check Valve) which is shaped as a flapper door.

In this embodiment, a plunger bearing a cutting device in retracted position, is introduced into said filler neck while its flapper door is open, and the assembly is punched by the core against the parison, inside a hole in one of the mold cavities, in order to compression mold an integrated flange recovering the filler neck. Then, the cutting device is moved forward and cuts an opening through the end of the filler neck and through the parison on top of it. Finally, the plunger bearing the parts cut off from the parison is retracted.

Preferably, the parts cut off from the parison are removed from the cutting device so that the plunger and its cutting device can be re-used in a process according to the invention.

In the process according to the invention, it should be pointed out that the parison is formed to the shape and dimensions of the tank essentially during step D so that the component is fastened at the correct location in the tank and so that the subsequent deformations are limited and do not damage the parison.

Preferably, the core allows several components to be fastened to the inside of the tank, these components preferably being preassembled on the core, before it is inserted into the mold, at their corresponding location on the parison (see the aforementioned application WO 2007/000454).

According to one particularly advantageous variant of the invention, several components are first mounted on a common support (frame) that is used for loading the core. Thus, even before loading into the core, the components may be positioned and assembled on this frame which allows excellent repeatability in the X, Y, Z positioning of the components and facilitates the handling of assemblies that are sometimes complex and therefore not very ergonomic (a ventilation system, for example).

The frame may be handled by an operator or by a robot, depending on the weight of the parts in question. As regards the loading of the core, it is in fact carried out by fastening the frame directly to the core, with the components arranged opposite devices that will fasten them to the parison and that are attached to the core (clamps actuated by actuators, for example). This approach makes it possible to make savings in terms of the cycle time since the assembly of the various components on the support can be carried out independently of the molding process.

The core used in the process according to the invention may also be used for blowing the pressurized gas required for blow-molding of the parison and, when the parison to be blow-molded is in two sections, the core may also be used to keep the edges of these two sections hot, during steps (C) to (E) at least of the process.

Finally, the core may also be used to monitor the process, at least in part. For this purpose, a camera may for example be incorporated into the core so as to display and check, by image analysis, the quality of the attachment of the component. At least one sensor for measuring quantities such as force, travel, pressure and temperature may also be fitted onto the core so as to better monitor the fastening of the component to the parison.

According to the invention, the component is fastened to the tank (or more precisely: to the parison, the word "tank" denoting the finished, molded article).

The term "fastened" understood to mean that the component is either directly in contact with the wall of the tank, or attached to an intermediate fastening means that is, itself, directly in contact with the tank wall. The term "contact" is understood to mean either a mechanical fastening (that can be dismantled) or a weld (or molecular interpenetration). The latter gives good results from the point of view of permeability and is practical to use within the context of the invention, as the parison is melted/softened during molding. It should be noted that other techniques (preferably also taking advantage of the fact that the parison is melted/softened) can also be used such as, for example, rivet punching. This is a technique described in application FR 04/08196 in the name of the Applicant, and the content of which is incorporated by reference in the present application.

The component may, in the case where it comprises a fastening flange, be fastened to the tank by means of a weld made all around the opening, thus ensuring a good impermeability of the fastening. For these purposes, the component may be provided, on the face of the flange pointed towards the parison, with a rib that goes all the way round the perimeter of the opening.

The component may be made from any material suitable for its function. In the case of a pipe that transports a fluid at a temperature close to ambient (such as a ventilation pipe for the tank (the purpose of which is generally to connect the top of the tank to a device for adsorbing fuel vapors or a canister), a vapour-venting line (that sends some of the vapors to the top of the fill pipe when the tank is being filled), a line for fixing the maximum fuel level (the obstruction of which by the level of fuel causes the nozzle to trip), etc.), this pipe is generally based on a plastic, and in particular on HDPE. It may also comprise a barrier layer or be entirely composed of barrier material.

When the component is (at least at the surface) based on the same material as the inner surface of the fuel tank (generally HDPE), the fastening of the component to the tank may be achieved by welding simply by pushing the component against the surface using a device attached to the core (which generally comprises an actuator for this purpose, for example a hydraulic actuator).

Figure 1:
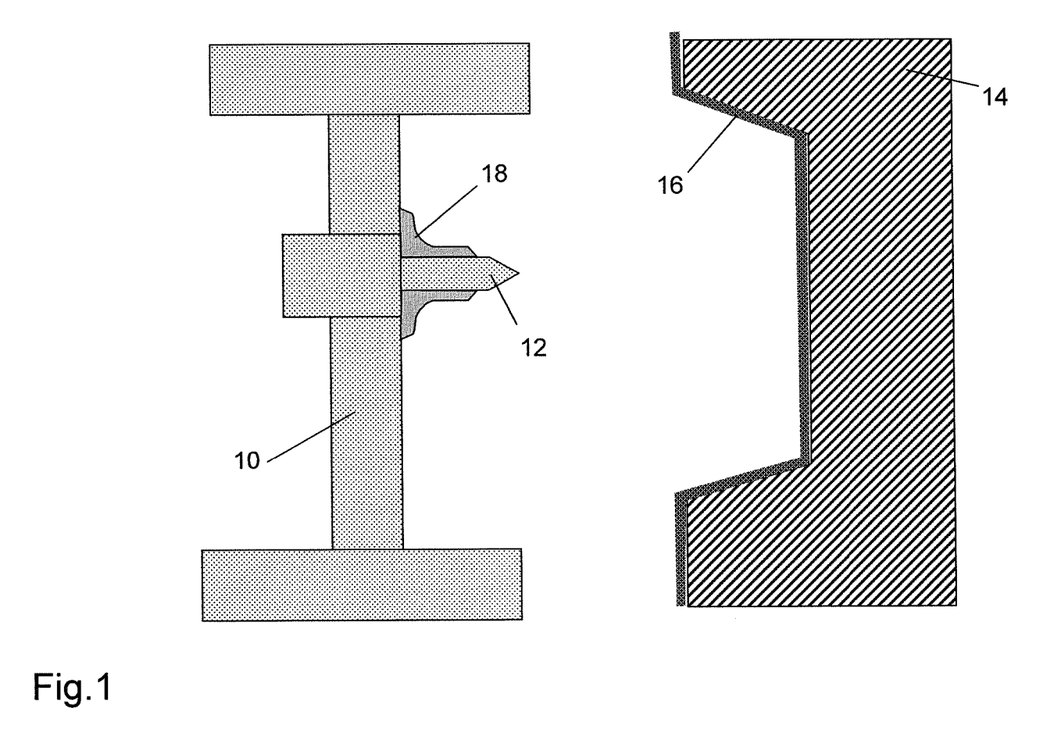
FIG. 1 illustrates a schematic cross-sectional view through a device for implementing the process according to the invention during step B.
Figure 2:
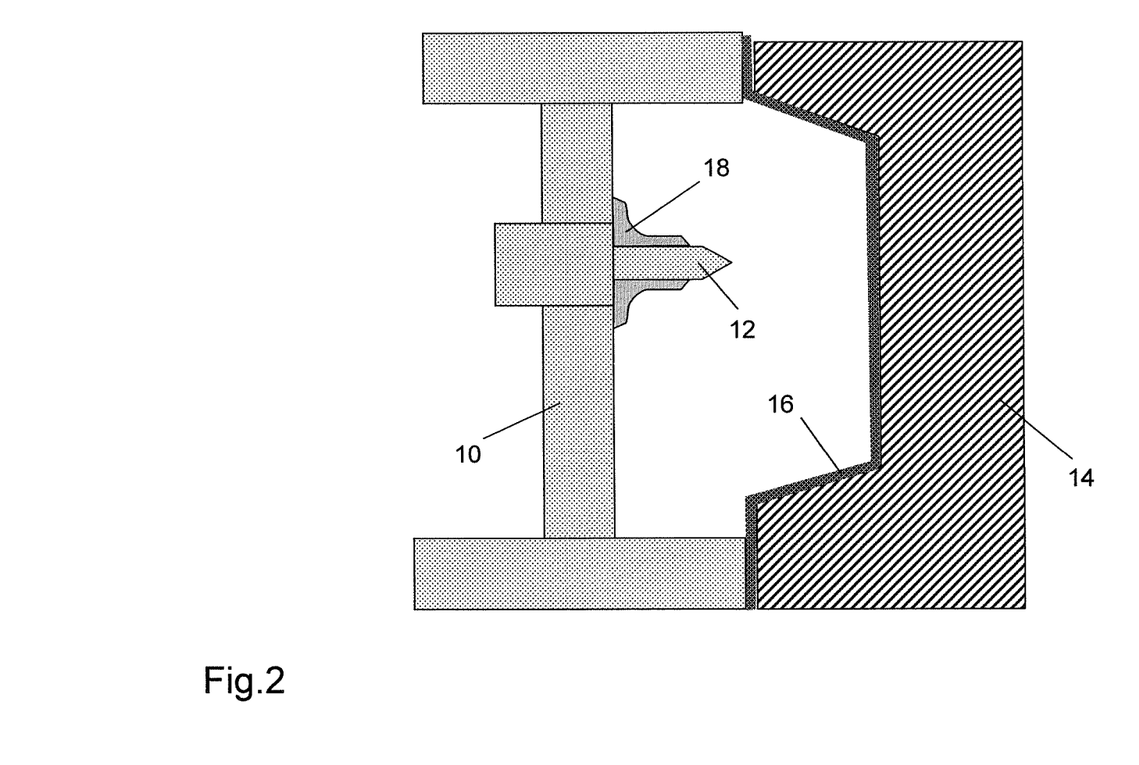
FIG. 2 illustrates a schematic cross-sectional view through the device from FIG. 1, during step C.
Figure 3:
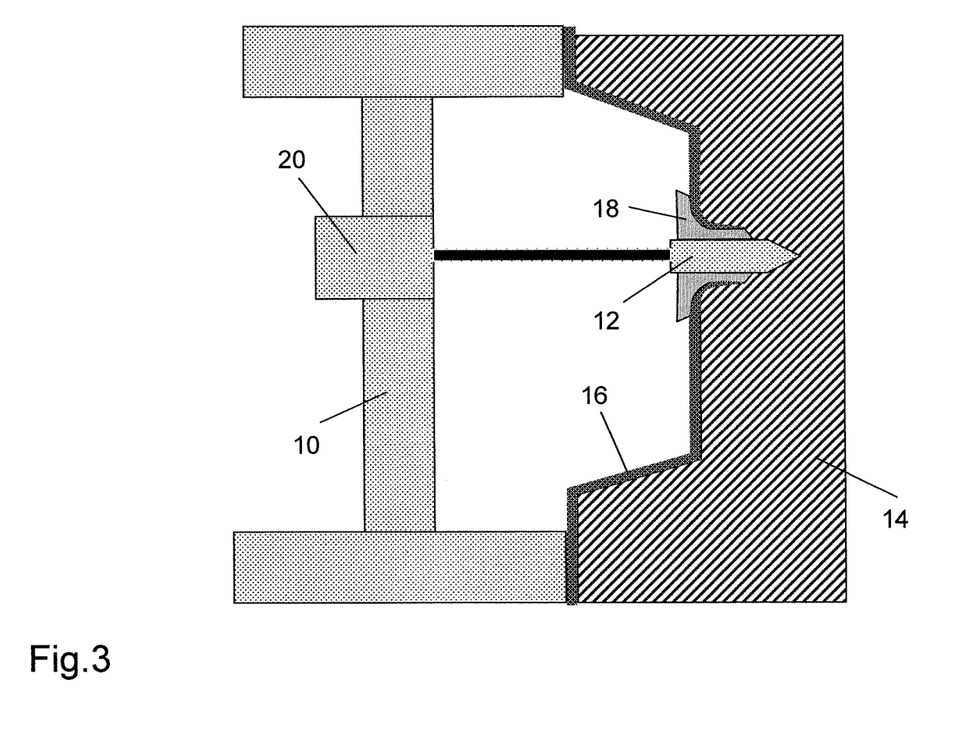
FIG. 3 illustrates a schematic cross-sectional view through the device from FIG. 1, during step E.
Figure 4:
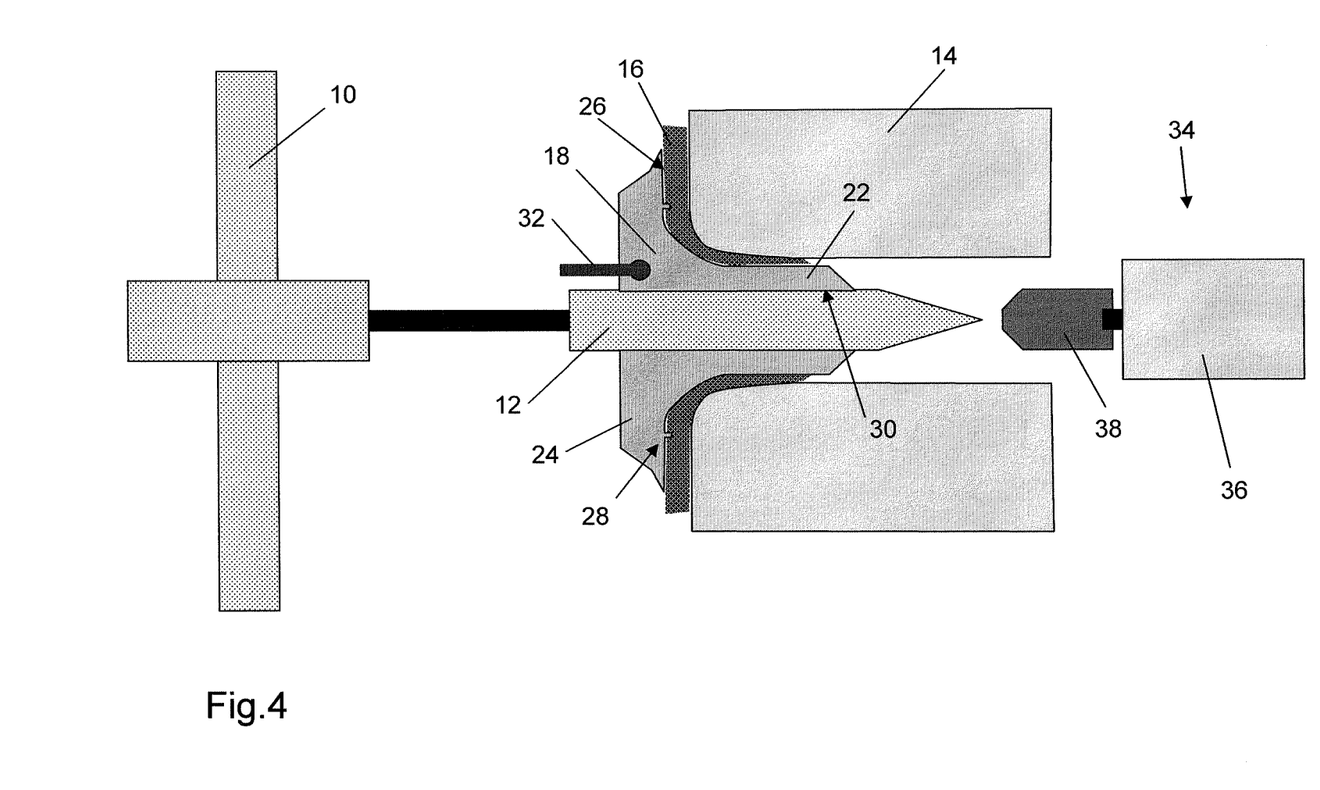
FIG. 4 illustrates a schematic cross-sectional view through a variant of the device from FIG. 1, during step E.
Figure 5:
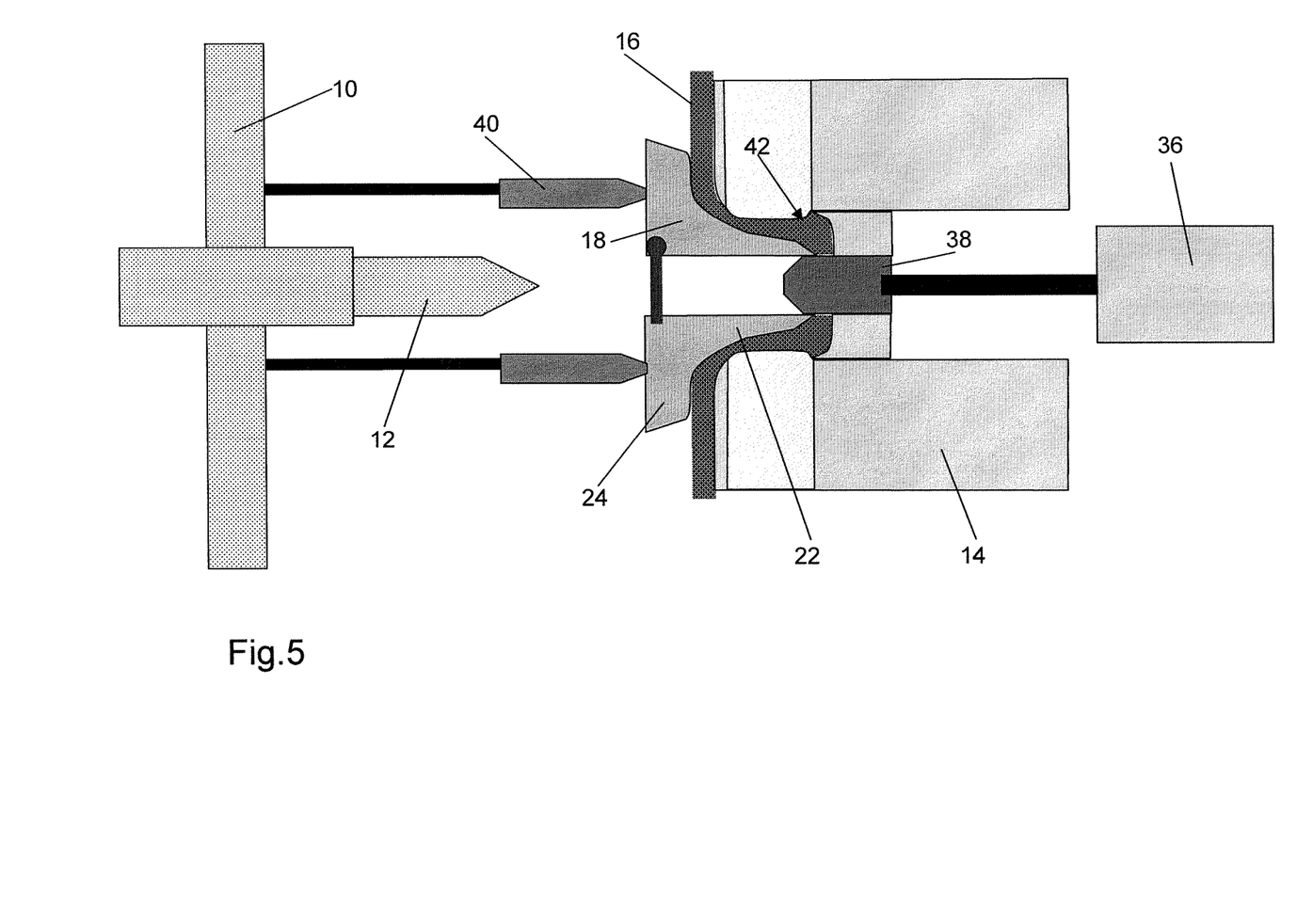
FIG. 5 illustrates a schematic cross-sectional view through another variant of the device from FIG. 1, during step E.

Other particular aspects and features of the invention will become apparent from the description of a few advantageous embodiments presented below, by way of illustration and by comparison with a less preferred method of fixation, with reference to the appended drawings which show:

FIG. 1: a schematic cross-sectional view through a device for implementing the process according to the invention during step B;

FIG. 2: a schematic cross-sectional view through the device from FIG. 1, during step C;

FIG. 3: a schematic cross-sectional view through the device from FIG. 1, during step E;

FIG. 4: a schematic cross-sectional view through a variant of the device from FIG. 1, during step E;

FIG. 5: a schematic cross-sectional view through another variant of the device from FIG. 1, during step E.

FIGS. 6 to 9: schematic views of a process according to a preferred embodiment of the invention using an oblong object (support or plunger) (5) bearing a cutting device (2), instead of a "needle", bearing a component (3) having a flapper door (4).

The basic cycle of the process according to the invention may be illustrated with reference to FIGS. 1 to 3, in which a core 10, a needle 12 attached to the core and a cavity 14 of a mold can be seen. During a step A, a parison 16 is introduced into the cavities 14 of the mold. However, said figures do not exactly reflect the core of the invention because the needle 12 is extending from the component 18 after step B has been performed, so that during step E, piercing of the parison will occur before deformation of the parison towards the outside. The figures are mainly used indeed to illustrate the basic molding process into which the fixation method of the invention fits.

In a step C, the mold is closed so that the cavities 14 come into leaktight contact with the core 10 so that the parison can be pressed on the mold in step D as illustrated in FIG. 2. The installation of the component 18 on the inner surface of the parison 16 (step E) is described with reference to FIG. 3. Using an actuator 20, the needle 12 is displaced in the direction of the parison 16 until the component 18 has come to rest inside a cavity into the mold 14, with its fastening element on the inner surface of the parison 16 and with an opening pierced into the parison. Then, the needle 12 is withdrawn, leaving the component 18 lodged in the opening created in the parison 16 by the piercing of the needle 12.

A variant of the device is illustrated in FIG. 4. This figure shows, as the component 18, a filler neck that has a cylindrical part 22 passing through the parison 16 and a flange 24 in contact with the inner surface 26 of the parison. The flange 24 illustrated also comprises a rib 28 over the entire perimeter thereof. This rib 28 serves as a weld edge. A passage 30 is made through the component 18 to be used as access to the tank in order to be able to fill the latter. The diameter of this passage 30 substantially corresponds to that of the base (cylindrical part) of the needle 12. The component also comprises a valve 32 that makes it possible to plug the passage 30, generally to avoid fuel losses in case of an accident and/or extraction of the fill pipe.

A plugging device 34 is also illustrated in FIG. 4. This plugging device 34 comprises a cavity section 36 with a movable plug 38 which may be displaced so as to block the passage 30 in the component 18 when the plug 38 is introduced into the passage 30 to prevent the evacuation of air from the tank during the subsequent blow-molding of the tank.

Another variant, similar to that from FIG. 4, is illustrated in FIG. 5. This figure shows the plug 38 in its position in the passage 30. A movable support device 40 may be used to keep the component 18 in place when the plug 38 is introduced into the passage 30 of the component 18. The cavity 14 of the mold is formed so that the part of the parison displaced by the needle 12 forms an end-piece 42 for the connection of a sleeve. The plug 38 then also serves to prevent air being blown between the cavity 14 and the outer surface of the parison.

Figure 6:
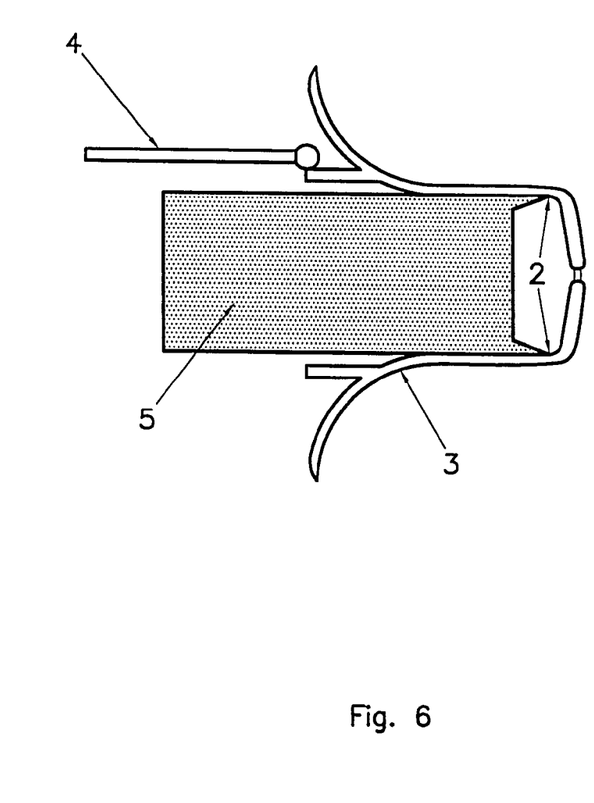
FIGS. 6 to 9 illustrate schematic views of a process according to a preferred embodiment of the invention using an oblong object (support or plunger) (5) bearing a cutting device (2), instead of a "needle", bearing a component (3) having a flapper door (4).
Figure 7:
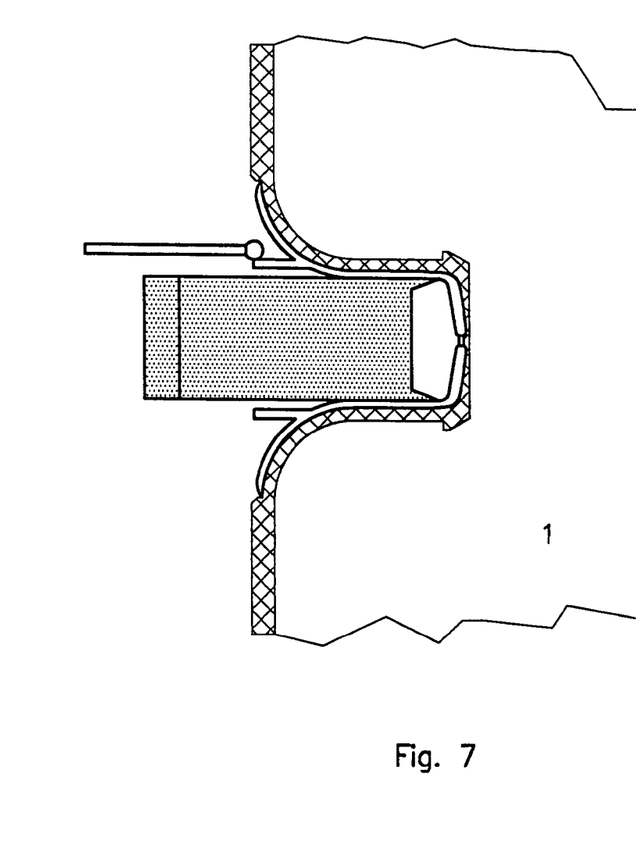
Figure 8:
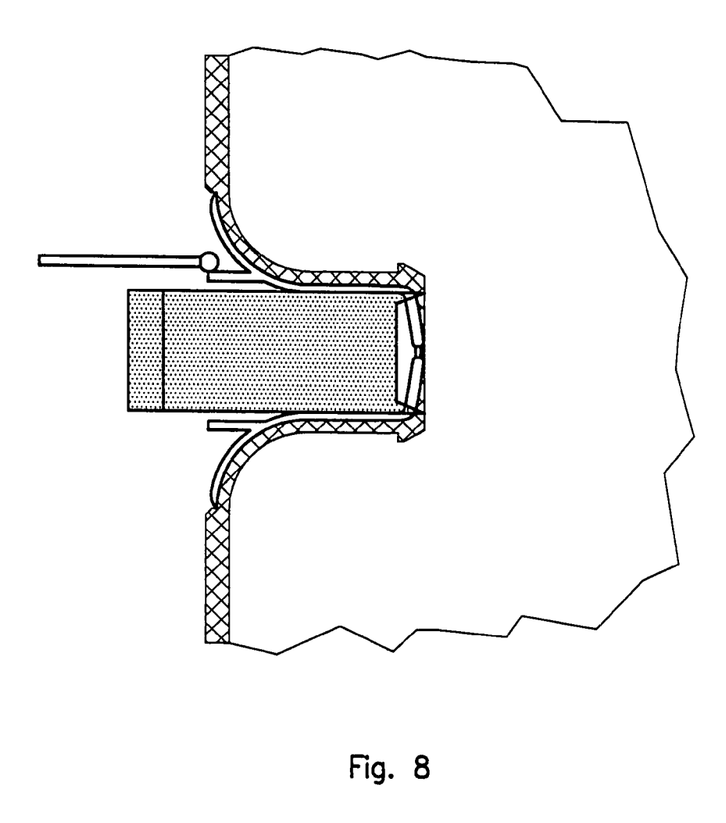
Figure 9:
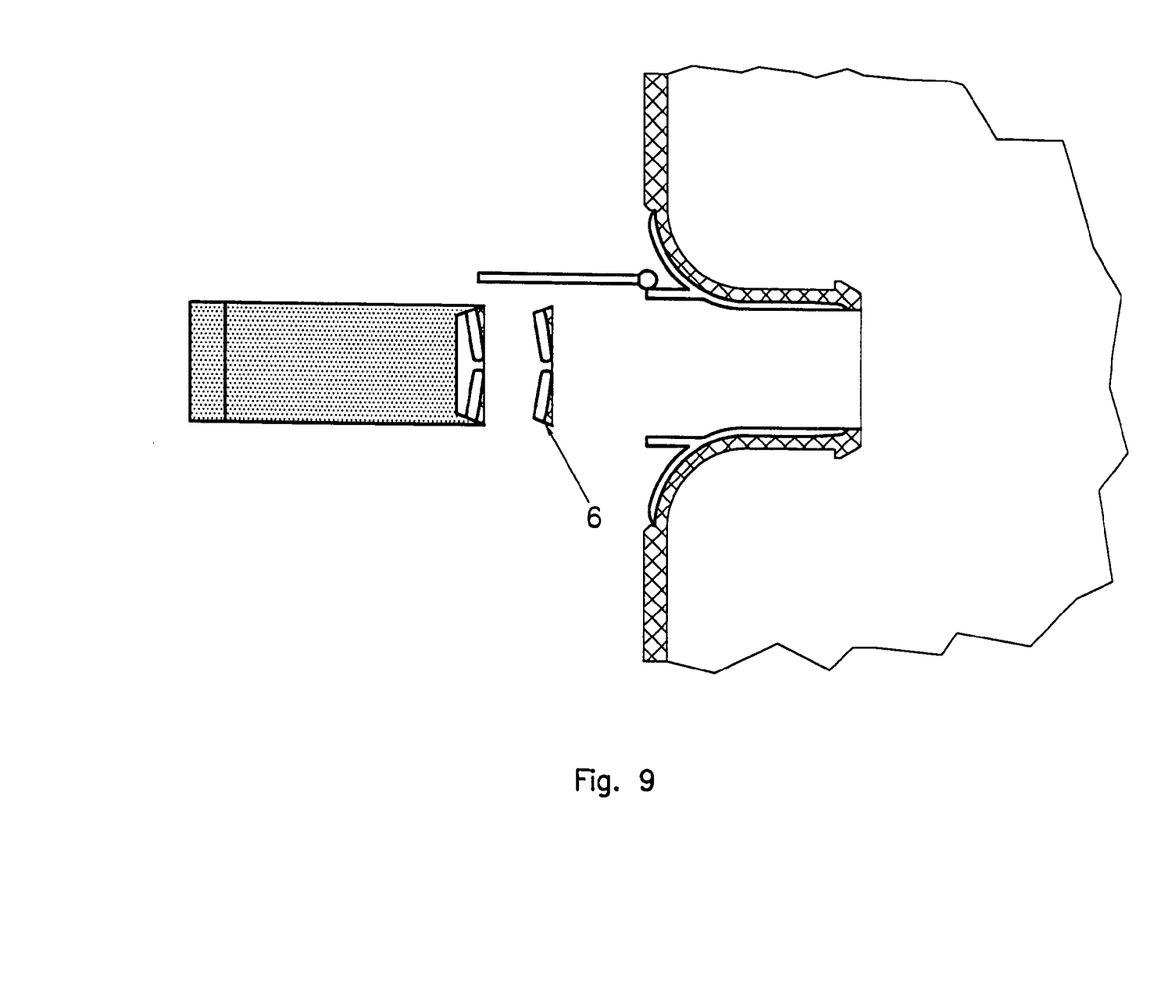

FIG. 6 shows a plunger (5) bearing a cutting device (2) and a component (3) with a flapper door (4), the fixation of which inside a parison will be illustrated in the next FIGS. 7 to 9). The component illustrated in these figures is a filler pipe and the flapper door is part of an ICV (Inlet Check Valve) and rests (is pushed towards) against a seal (which is not shown).

In said Figures, the parison is represented after it has undergone steps A to D in a similar way as illustrated in FIGS. 1 and 2, but has undergone a step E which is different than in FIGS. 3 and 4. In fact, as illustrated in FIG. 7, the component (3), received on the plunger (5), has compression molded the parison inside a cavity into the mold prints (1). Until the end of this compression molding, the cutting device (2) remains retracted.

Then, as shown in FIG. 8, said cutting device (2) is moved forward so that an opening is cut into the parison.

Finally, as shown in FIG. 9, the plunger (5) and the cutting device (2) are removed so that the portion of the component (3) and of the parison, which constitute a lost (waste) part (6) can be removed from it (as shown in fact in FIG. 9), so that the plunger and its cutting device are ready to be used again in another process according to the invention. In that embodiment, a plug (like the one of FIGS. 4 and 5) can be used in order to close the opening which has been cut into the filler neck and so, prevent air being blown between the cavity and the outer surface of the parison.

In another embodiment, which is not illustrated, the plunger used to push the inner plastic component inside the molten material only makes a precut and the tip of the filler neck is only completely opened after the tank blowing, as a secondary operation. The main advantage of this embodiment is that no plug is required to handle the tightness problem during the second blowing phase of the process.

However, in that embodiment, when the flapper door will be closed (which naturally happens during the final blowing because said door is by default (at rest) in this position, for instance through the use of a spring), a cavity is created which will have a different blowing pressure during the second phase of the blowing cycle.

In order to prevent the seal from over-compression/being damaged, the design of the component can advantageously foresee a limitation on the compression of the seal (by providing a mechanical stopper for instance, which can be the gutter where the seal is located, the height of which then being adapted in order to limit the compression of the seal).

The invention claimed is:

1. A process for manufacturing a plastic fuel tank equipped with a component, by molding a parison using a mold comprising two cavities and a core, said process comprising the following steps:
   A) introducing a parison into the mold cavities;
   B) introducing the core inside the parison, said core having first been fitted with a component;
   C) closing the mold so that the cavities come into leaktight contact with the core;
   D) pressing the parison against the cavities by blowing through the core and/or applying a vacuum behind the cavities;
   E) installing the component on the inner wall of the parison using a device attached to the core;
   F) opening the mold in order to withdraw the core; and
   G) finally, molding the parison by blow-molding and/or thermoforming;
   wherein step B comprises mounting the component around a needle or an oblong object comprising a cutting device, attached to the core, and wherein step E comprises the following steps:
   E1) displacing the needle or cutting device so as to first deform the parison and after, piercing an opening into it, the needle or oblong object carrying the component with it in order to position the component in the opening; and
   E2) withdrawing the needle or oblong object, leaving the component lodged in the opening.

2. The process according to claim 1, wherein the deformation of the parison creates a flange towards the outside of the tank, and wherein said flange, the component and the needle/oblong object are received in a hole of suitable size and shape in one of the mold cavities, which is created by retraction of a moving part into said hole.

3. The process according to claim 1, wherein the parison is made up of two separate pieces originating from one and the same extruded tubular parison that is cut over its entire length, along two diametrically opposed lines.

4. The process according to claim 1, wherein the needle or oblong object is movably mounted relative to the core.

5. The process according to claim 1, wherein the component is a filler neck, a ventilation pipe, an OBD line, or an electrical connector.

6. The process according to claim 1, wherein the component comprises a passage that has a diameter similar to the diameter of the base of the needle or the oblong object, and through which passage the needle/cutting device pierces the parison, while the deformation of the parison is mainly induced by the component itself.

7. The process according to claim 6, wherein the passage is closed when the component is mounted on the needle/oblong object, and wherein said passage is only pierced when the needle/oblong object pierces the parison.

8. The process according to claim 1, wherein the component is a filler neck integrating an ICV (Inlet Check Valve) comprising a flapper door.

9. The process according to claim 8, wherein step E comprises the following sub-steps:
   a plunger bearing a cutting device in retracted position, is introduced into the filler neck while its flapper door is open;
   the assembly is pushed by the core against the parison, inside a hole in one of the mold cavities so as to compression mold an integrated flange recovering the filler neck;
   the cutting device is moved forward and cuts an opening through the end of the filler neck and through the parison on top of it; and
   the plunger bearing the parts cut off from the parison is retracted.

10. The process according to claim 9, wherein the parts cut off from the parison are removed from the cutting device, and wherein the plunger and its cutting device are re-used in said process.

11. The process according to claim 10, wherein during step G, which is a blow-molding operation, a plug is used to close the opening which has been cut into the filler neck.

12. The process according to claim 9, wherein the plunger only makes a precut and the tip of the filler neck is only completely opened after the tank molding, during a secondary (finishing) operation.

13. The process according to claim 12, wherein the flapper door rest against a seal which is located in a gutter molded in the ICV, the height of which being adapted in order to limit the compression of the seal during step G.

* * * * *